United States Patent
Uno et al.

(10) Patent No.: US 9,758,935 B2
(45) Date of Patent: Sep. 12, 2017

(54) WATERPROOF SHEET FOR USE IN BRIDGE PIER REPAIR AND WATERPROOF WORKING METHOD USING THE SAME

(71) Applicant: Shin-Etsu Chemical Co., Ltd., Chiyoda-ku, Tokyo (JP)

(72) Inventors: Takao Uno, Annaka (JP); Yoshiyuki Shiono, Annaka (JP); Akihiro Endo, Annaka (JP); Takeshi Nakajima, Osaka (JP); Hisaharu Yamaguchi, Annaka (JP); Masahiro Yoda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 372 days.

(21) Appl. No.: 14/553,762

(22) Filed: Nov. 25, 2014

(65) Prior Publication Data

US 2015/0083304 A1    Mar. 26, 2015

Related U.S. Application Data

(62) Division of application No. 14/043,633, filed on Oct. 1, 2013, now Pat. No. 8,999,504.

(30) Foreign Application Priority Data

Oct. 2, 2012 (JP) .................. 2012-220342

(51) Int. Cl.
  *B32B 17/10* (2006.01)
  *B32B 7/12* (2006.01)
  (Continued)

(52) U.S. Cl.
  CPC ............ *E01D 22/00* (2013.01); *B29C 65/106* (2013.01); *B29C 65/14* (2013.01); *B29C 65/48* (2013.01);
  (Continued)

(58) Field of Classification Search
  CPC ....... B29C 65/48; B29C 65/483; B29C 65/02; B29C 65/106; B29C 65/14;
  (Continued)

(56) References Cited

U.S. PATENT DOCUMENTS 3,181,300 A * 5/1965 Plummer .................. E02D 5/60
                                                  138/128
3,935,348 A   1/1976 Smith
(Continued)

FOREIGN PATENT DOCUMENTS

JP   2-269157 A    11/1990
JP   8-198384 A    8/1996
(Continued)

*Primary Examiner* — Philip Tucker
*Assistant Examiner* — Brian R Slawski
(74) *Attorney, Agent, or Firm* — Birch, Stewart, Kolasch & Birch, LLP

(57) ABSTRACT

When a bridge pier is reinforced or repaired by wrapping a reinforcement around the pier, a waterproof sheet having a sufficient flexibility to attach to and cover the interface between the pier and the reinforcement in a liquid-tight manner is useful. The waterproof sheet is attached to the interface between the pier and the reinforcement to prevent water from penetrating into the interface for thereby preventing the reinforcement from deterioration.

15 Claims, 3 Drawing Sheets

(51) Int. Cl.
| | |
|---|---|
| B32B 15/04 | (2006.01) |
| E04B 2/00 | (2006.01) |
| E04F 13/00 | (2006.01) |
| B29C 73/00 | (2006.01) |
| B32B 43/00 | (2006.01) |
| B65H 81/00 | (2006.01) |
| H01F 41/12 | (2006.01) |
| C09J 7/02 | (2006.01) |
| B32B 37/00 | (2006.01) |
| B29C 65/00 | (2006.01) |
| E01D 22/00 | (2006.01) |
| B29C 65/14 | (2006.01) |
| B32B 37/04 | (2006.01) |
| B29C 65/10 | (2006.01) |
| B32B 25/04 | (2006.01) |
| B29C 65/48 | (2006.01) |

(52) U.S. Cl.
CPC ...... *B29C 65/4895* (2013.01); *B29C 66/5221* (2013.01); *B29C 66/73187* (2013.01); *B32B 25/04* (2013.01); *B32B 37/04* (2013.01); *Y10T 428/239* (2015.01); *Y10T 428/269* (2015.01); *Y10T 428/2826* (2015.01); *Y10T 428/2835* (2015.01); *Y10T 428/2852* (2015.01)

(58) Field of Classification Search
CPC ............ B29C 65/4895; B29C 66/5221; B29C 66/73187; Y10T 156/10; Y10T 156/103; Y10T 156/1033; B32B 25/04; B32B 25/08; B32B 25/10; B32B 2405/00; B32B 37/04; B32B 37/12; E04B 1/665
USPC ..... 156/60, 71, 94, 184, 185, 187, 196, 212, 156/213, 215, 217, 218, 242, 246, 308.2, 156/308.6, 309.6, 309.9, 320, 322, 324.4, 156/325, 326, 327, 329, 333, 334, 338; 428/98, 212, 213, 214, 221, 332, 337, 428/339, 343, 346, 347, 349, 351, 355 R
See application file for complete search history.

(56) References Cited

U.S. PATENT DOCUMENTS

| | | | |
|---|---|---|---|
| 4,713,129 A * | 12/1987 | Inhofe, Jr. | ............. B29C 65/342 156/215 |
| 5,500,280 A | 3/1996 | Yamazaki et al. | |
| 6,147,149 A * | 11/2000 | Anderson | ................ C08K 3/22 428/402 |
| 6,344,104 B1 | 2/2002 | Sekiya et al. | |
| 2003/0190484 A1 | 10/2003 | Kashiwagi et al. | |
| 2006/0142472 A1 | 6/2006 | Hirai et al. | |
| 2008/0280086 A1 | 11/2008 | Sheridan et al. | |
| 2009/0120557 A1* | 5/2009 | Serra | ......................... B32B 3/08 156/71 |
| 2009/0186151 A1* | 7/2009 | Vijayakumar | ..... B01D 39/2024 427/140 |
| 2009/0308517 A1 | 12/2009 | Nohara et al. | |
| 2010/0035501 A1 | 2/2010 | Prudhomme et al. | |
| 2012/0247033 A1* | 10/2012 | Nakajima | ........... C09D 183/04 52/58 |

FOREIGN PATENT DOCUMENTS

| | | |
|---|---|---|
| JP | 2002-363318 A | 12/2002 |
| JP | 3580887 B2 | 10/2004 |
| JP | 2005-48500 A | 2/2005 |
| JP | 3748525 B2 | 2/2006 |
| JP | 2008-24228 A | 2/2008 |
| JP | 4076673 B2 | 4/2008 |
| JP | 2008-169576 A | 7/2008 |
| JP | 4509624 B2 | 7/2010 |
| JP | 4910200 B2 | 4/2012 |

* cited by examiner

WATERPROOF SHEET FOR USE IN BRIDGE PIER REPAIR AND WATERPROOF WORKING METHOD USING THE SAME

CROSS-REFERENCE TO RELATED APPLICATIONS

This application is a Divisional of application Ser. No. 14/043,633, filed on Oct. 1, 2013 now U.S. Pat. No. 8,999,504, which claims priority under 35 U.S.C. §119(a) to Patent Application No. 2012-220342 filed in Japan on Oct. 2, 2012. All of the above applications are hereby expressly incorporated by reference into the present application.

TECHNICAL FIELD

This invention relates to a waterproof sheet for use in repair works (commonly known as lining works) for seismic and obsolescent countermeasures or reinforcements of piers of bridges which are overhead structures that extend over roads (including ordinary roads and highways), railways (including Shinkansen and monorails), and obstacles (e.g., water channels), the waterproof sheet being attached to the interface between the bridge pier and the reinforcement to prevent penetration of rain or water into the interface for thereby preventing the reinforcement from deterioration. It also relates to a waterproof working method using the waterproof sheet.

BACKGROUND ART

In conjunction with bridges which are overhead structures that extend over roads, railways, obstacles or the like, repair works are undertaken for the reinforcement of bridge piers against seismic failure and obsolescent deterioration. Such repair works are commonly known as lining works and include RC lining, steel plate lining and fiber lining as the mainstream works. However, since most bridges or overhead structures are located in the outdoor environment, they are exposed to weathering including rain, snow and mist. In the prior art, less efforts have been made on the countermeasure against penetration of rain water. Insofar as the inventors know, application of sealants is the only one known countermeasure. The steel plate lining and fiber lining methods require cumbersome maintenance and management, and the RC lining method needs a long working time. The mortar spraying method is proposed as an improvement over these methods and considered attractive. The mortar spraying method, however, includes a plurality of cumbersome steps, for example, the thickness of sprayed mortar must be controlled via reinforcing steel guides or the like, and the cure is time consuming. Under the circumstances, if deterioration over time can be suppressed by taking a countermeasure against penetration of rain water, then some advantages are expected including an extension of the life of bridges and a reduction of the expense for maintenance and management. In the current practice of applying sealants, the surface to be applied must be dry. In case of bad weather like rain, snow or mist, workers must wait until the weather becomes fine and specifically until the wet surface becomes dry enough to accept the sealant.

CITATION LIST

Patent Document 1: JP 4076673
Patent Document 2: JP 3580887
Patent Document 3: JP 3748525
Patent Document 4: JP 4509624
Patent Document 5: JP 4910200

SUMMARY OF INVENTION

An object of the invention is to provide a waterproof sheet which is attached to the interface between a bridge pier and a reinforcement wrapped therearound to prevent penetration of rain or water into the interface for thereby preventing the reinforcement from deterioration, and a waterproof working method using the waterproof sheet. Unlike waterproof works only with sealants, the surface of a structure can be worked simply after wiping off any residual water with fabric waste or the like without a need for full drying. The working time can be drastically shortened.

In one aspect, the invention provides a waterproof sheet for use in a method for reinforcing and repairing a bridge pier by wrapping a reinforcement around the pier, the waterproof sheet having a sufficient flexibility to attach to and cover the interface between the pier and the reinforcement in a liquid-tight manner.

Preferably, the waterproof sheet has one surface to attach to and cover the interface, the one surface having tackiness.

In one preferred embodiment, the waterproof sheet is a single layer having one surface to attach to and cover the interface, the one surface having been made tacky by heat treatment, flame treatment, electron beam treatment or acid or base treatment. Alternatively, the one surface has been made tacky by applying a primer or adhesive thereto.

In another preferred embodiment, the waterproof sheet comprises a substrate layer and a tacky layer which lies on one surface of the substrate layer and which is to attach to and cover the interface.

The substrate layer may comprise an unvulcanized or vulcanized elastomer. Preferably the substrate layer may comprise an elastomer selected from among silicone rubber, EPDM rubber, butyl rubber, chloroprene rubber, and natural rubber. Specifically, the substrate layer comprises an elastomer having a hardness of 10 to 90 on Durometer type A scale, a tensile strength of at least 3 MPa, an elongation of 100 to 800%, and a tear strength of at least 3 kN/m.

Typically, the tacky layer is based on an organopolysiloxane. Preferably, the tacky layer is formed of a cured product of an addition cure silicone rubber composition, said composition comprising (A) 0 to 100 parts by weight of an organopolysiloxane containing at least two silicon-bonded alkenyl groups per molecule, having the average compositional formula (1):

$$R^1_a SiO_{(4-a)/2} \qquad (1)$$

wherein $R^1$ is each independently a substituted or unsubstituted monovalent hydrocarbon group of 1 to 10 carbon atoms, and a is a positive number from 1.5 to 2.8, (B) 0 to 100 parts by weight of a resinous copolymer predominantly comprising $R_3SiO_{1/2}$ units and $SiO_2$ units in a molar ratio $(R_3SiO_{1/2}/SiO_2)$ of 0.5/1 to 1.5/1, wherein R is a substituted or unsubstituted monovalent hydrocarbon group and contains an alkenyl group, a total amount of alkenyl being at least 0.0001 mol/g, with the proviso that the total amount of components (A) and (B) is 100 parts by weight, (D) an organohydrogenpolysiloxane containing at least two silicon-bonded hydrogen atoms per molecule, in an amount of 0.5 to 30 parts by weight per 100 parts by weight of components (A) and (B) combined, and such that the molar ratio of silicon-bonded hydrogen in component (D) to silicon-bonded alkenyl in components (A) and (B) may be in a range of 0.2/1 to 1.5/1, and (E) a catalytic amount of an addition reaction catalyst, the cured product presenting a tacky surface.

The addition cure silicone rubber composition may further comprise (C) a second resinous copolymer predominantly comprising $R'_3SiO_{1/2}$ units and $SiO_2$ units in a molar ratio $(R'_3SiO_{1/2}/SiO_2)$ of 0.5/1 to 1.5/1, wherein R' is a substituted or unsubstituted monovalent hydrocarbon group, R' does not contain an alkenyl group or contains an alkenyl group in a total amount of less than 0.0001 mol/g, in an amount of 0 to 400 parts by weight per 100 parts by weight of components (A) and (B) combined. When component (C) contains alkenyl, the molar ratio of silicon-bonded hydrogen in component (D) to silicon-bonded alkenyl in components (A), (B) and (C) is in a range of 0.32/1 to 0.75/1.

Preferably, the tacky layer has an Asker C hardness of up to 60 and a bond strength of 0.5 to 10 N/25 mm to glass.

Typically, the substrate layer has a thickness of 0.2 to 5 mm and the tacky layer has a thickness of 0.3 to 3 mm. Also typically, the waterproof sheet has a thickness of 0.5 to 8 mm.

In connection with the pier lining work of reinforcing and repairing a bridge pier by wrapping a reinforcement around the pier, the invention provides a method for waterproof working the bride pier, comprising the step of attaching the waterproof sheet defined above to the interface between the pier and the reinforcement so as to cover the interface in a liquid-tight manner for thereby preventing water penetration through the interface.

Typically, the waterproof sheet is directly attached to the interface without a primer.

The waterproof working method may further comprise the step of applying a sealant to the waterproof sheet so as to cover an edge portion of the waterproof sheet on the pier and/or reinforcement side. The sealant is typically a silicone sealant.

Advantageous Effects of Invention

In the repair work of wrapping a reinforcement around a bridge pier, so-called pier lining work, a waterproof sheet is attached to the interface between the pier and the reinforcement to prevent penetration of rain or water into the interface for thereby preventing the reinforcement from deterioration. The waterproof working method using the waterproof sheet allows the working time to be drastically shortened.

DESCRIPTION OF PREFERRED EMBODIMENTS

As used herein, the term "tacky" is interchangeable with pressure-sensitive adhesive. A region extending across the interface between a pier and a reinforcement where the waterproof sheet is attached is sometimes referred to as "adherend region."

Figure 1:
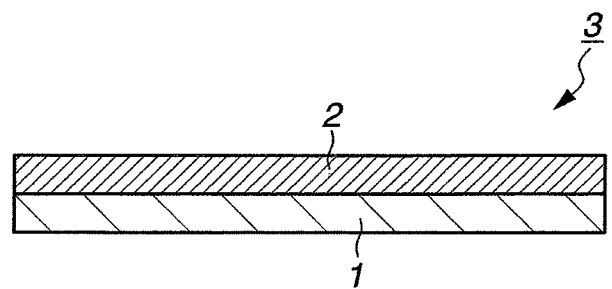
FIG. 1 is a cross-sectional view of a waterproof sheet of multilayer structure in one embodiment of the invention.

In conjunction with the repair work of wrapping a reinforcement around a bridge pier, so-called pier lining work, the invention provides a flexible waterproof sheet which is attached to the interface between the pier and the reinforcement to prevent penetration of rain or water into the interface. The waterproof sheet may have either a single layer or multilayer structure. The waterproof sheet is depicted at 3 in FIG. 1 as a multilayer structure including a substrate 1 and a tacky layer 2. Since its main purpose is waterproofing, the sheet is preferably made of an elastomer. The elastomer used herein may be either unvulcanized or vulcanized. During shelf storage or prior to use, the waterproof sheet is preferably protected with a cover film.

In one embodiment wherein the waterproof sheet is a single layer, it may be obtained by adding a tacky agent to a substrate material. One suitable material is obtained by blending 1 to 50%, preferably 2 to 30% by weight of a resinous copolymer to be described as component (B) later in a silicone rubber. Alternatively, the surface of a sheet may be made tacky by carrying out suitable surface treatment such as heat treatment, flame treatment, electron beam (EB) treatment, or chemical treatment (treatment with acid or base). The sheet need not be tacky. Even in the case where the sheet is not tacky, if the adherend region where the sheet is to be attached is pretreated with a primer, adhesive or the like, then the sheet may be attached to the region.

In the other embodiment wherein the waterproof sheet has a multilayer structure, the structure is broadly divided into a substrate layer and a tacky layer. It is preferred from the aspects of manufacture of a sheet and handling of a sheet during working that the substrate layer be made of an elastomer. Although the type of elastomer is not particularly limited, the preferred elastomers include silicone rubber, ethylene-propylene-diene terpolymer (EPDM) rubber, butyl rubber, chloroprene rubber, butadiene rubber, styrene-butadiene copolymer, urethane rubber, natural rubber, composite silicone rubber/EPDM rubber (available as SEP rubber from Shin-Etsu Chemical Co., Ltd.). For heat resistance, weather resistance and freeze resistance, silicone rubber, EPDM rubber, butyl rubber, chloroprene rubber and natural rubber are preferred. Inter alia, silicone rubber is most preferred in view of the service environment which ranges from very cold to very hot climate.

In view of handling of the waterproof sheet, the single layer or the substrate layer of the multilayer sheet may be vulcanized or unvulcanized as long as it maintains its shape in the working environment on assumption. The unvulcanized state is exemplified by an unvulcanized silicone rubber composition, unvulcanized butyl rubber composition or the like.

When the composition is vulcanized and shaped into a sheet, the vulcanizing method is not particularly limited. In view of a drastic shortening of the working time, the composition of the type which is already vulcanized into a sheet is preferred to the composition of the type which is cured in situ. The modes of vulcanization include organic peroxide vulcanization, addition vulcanization, sulfur vulcanization, UV vulcanization, and EB vulcanization.

Any well-known vulcanizing agents may be used for curing the elastomer. In the organic peroxide vulcanization mode, suitable vulcanizing agents include acyl organic peroxides such as p-methylbenzoyl peroxide and o-methylbenzoyl peroxide, alkyl organic peroxides such as dicumyl peroxide and 2,5-dimethyl-2,5-bis(tert-butylperoxy)hexane, percarbonate organic peroxides and peroxy ketal organic peroxides.

In the addition vulcanization mode, a polymer containing at least two alkenyl groups per molecule is reacted with a compound having at least two functional groups capable of reacting with alkenyl groups per molecule in the presence of a catalyst. Hydrosilylation reaction is a typical example of this mode. The sulfur vulcanization is a well-known mode commonly used in the vulcanization of synthetic rubber. In the UV vulcanization (or UV cure) mode, a rubber compound containing a polymerization photoinitiator is cured by irradiating UV of wavelength 200 to 400 nm for several seconds to several tens of seconds. UV wavelength used is typically 254 nm or 365 nm. Any well-known photoinitiators may be used, for example, Irgacure 184 (BASF). EB vulcanization (or EB cure) is by accelerating electrons and directing the resulting electron beam to a rubber compound so that the rubber compound may be cured by utilizing the energy of electron beam. The degree of vulcanization is adjustable in terms of accelerating voltage and penetration depth. A typical EB vulcanization system is commercially available from Iwasaki Electric Co., Ltd.

When the single layer or substrate layer is formed by vulcanizing an elastomer, the vulcanized elastomer should preferably have rubber physical properties including a hardness of 10 to 90 on Durometer type A scale, a tensile strength of at least 3 MPa, an elongation of 100 to 800%, and a tear strength of at least 3 kN/m. Since these rubber physical properties are correlated to sheet characteristics, if one or more of hardness, tensile strength, elongation and tear strength are outside the range, problems arise during or after application of the sheet. Specifically, if hardness is lower and elongation is greater, the sheet is so deformable that the attachment operation upon application is difficult and even after the sheet is attached, it may be moved aside. On the other hand, if hardness is higher and elongation is lower, the sheet is less compliant during the attachment operation upon application, then an accuracy of positioning is required, adversely affecting the working efficiency, and the sheet cannot follow the repeated thermal expansion/contraction of the bridge pier with the ambient temperature after application. Further, if tensile strength or tear strength is lower, the sheet cannot withstand the stress applied thereto by irregularities on the adherend region, becoming sensitive to damages like cuts and tears.

The tacky layer is not particularly limited as long as its surface is tacky to the hand in touch. For example, an elastomer, typically butyl rubber or silicone resin is used in the uncured state so that it may be tacky, or the degree of crosslinking is adjusted so as to remain tacky. Tackiness may be exerted by keeping a certain proportion of functional groups in the polymer unreacted.

Described below is the other embodiment of the waterproof sheet including a substrate layer and a tacky layer. As described above, the substrate is constructed by a rubber, preferably a silicone rubber having heat resistance, weather resistance and freeze resistance. The silicone rubber is not particularly limited, and any silicone rubbers obtained by curing prior art well-known silicone rubber compositions may be used. It is preferred from the standpoints of elasticity and rubber strength to use a silicone rubber having a hardness of 10 to 90, more preferably 20 to 80 on Durometer A scale according to JIS K6249. Even more preferably the hardness of silicone rubber is at least 25, especially at least 40 and up to 80, especially up to 75 on Durometer A scale.

A rubber hardness of less than 10 may lead to low strength whereas a rubber hardness in excess of 90 may lead to low elasticity.

Although the silicone rubber composition may be of any cure type, the addition (or hydrosilylation) reaction cure type or organic peroxide cure type is preferred because molding is completed within a short time by heating. The silicone rubber composition of addition cure type may be any well-known composition, typically comprising an alkenyl-containing organopolysiloxane containing at least two alkenyl (typically vinyl) groups per molecule, an organohydrogenpolysiloxane having at least two, preferably at least three SiH groups (typically in such an amount as to give a SiH/alkenyl molar ratio of 0.5/1 to 4/1), and a platinum group metal-based addition reaction catalyst, such as platinum or a platinum compound (typically in such an amount as to give 0.5 to 1,000 ppm of platinum group metal based on the weight of the alkenyl-containing organopolysiloxane). The silicone rubber composition of organic peroxide cure type may be any well-known composition, typically comprising an organopolysiloxane containing at least two alkenyl groups per molecule and an organic peroxide in an effective amount as curing agent (typically 1 to 10 parts by weight per 100 parts by weight of the organopolysiloxane).

The silicone rubber compositions mentioned above are commercially available. For example, silicone rubber compositions of the addition cure type are available as KE-1935A/B, KE-1950-60A/B and KEG-2000-40A/B, and silicone rubber compositions of the organic peroxide cure type are available as KE-551-U, KE-571-U, KE-1571-U and KE-951-U, all from Shin-Etsu Chemical Co., Ltd.

The tacky layer is constructed by a silicone resin or gel having tackiness. Particularly when a layer is constructed by a silicone resin composition of the addition cure type, the layer may have a certain rubber hardness and strength as well as sufficient tackiness to bond and attach to the substrate and various parts.

In a preferred embodiment, the tacky layer is formed of a cured product of an addition cure silicone rubber composition comprising (A) an organopolysiloxane containing at least two silicon-bonded alkenyl groups per molecule and/or (B) a resinous copolymer predominantly comprising $R_3SiO_{1/2}$ units and $SiO_2$ units wherein R is a substituted or unsubstituted monovalent hydrocarbon group and contains an alkenyl group, (D) an organohydrogenpolysiloxane containing at least two silicon-bonded hydrogen atoms (i.e., SiH groups) per molecule, and (E) an addition reaction catalyst, the cured product presenting a tacky surface. If desired, the addition cure silicone rubber composition may further comprise (C) a second resinous copolymer predominantly comprising $R'_3SiO_{1/2}$ units and $SiO_2$ units wherein R' is a substituted or unsubstituted monovalent hydrocarbon group, R' does not contain an alkenyl group or contains an alkenyl group in an amount less than the alkenyl content in component (B).

Component (A) is an organopolysiloxane containing on average at least two alkenyl groups per molecule. It has the average compositional formula (1):

$$R^1_a SiO_{(4-a)/2} \qquad (1)$$

wherein $R^1$ is each independently a substituted or unsubstituted monovalent hydrocarbon group of 1 to 10 carbon atoms, preferably 1 to 8 carbon atoms, and a is a positive number in the range of 1.5 to 2.8, preferably 1.8 to 2.5, and more preferably 1.95 to 2.05. Examples of the silicon-bonded, substituted or unsubstituted, monovalent hydrocarbon group represented by $R^1$ include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl, and substituted forms of the foregoing in which some or all hydrogen atoms are substituted by halogen atoms (e.g., fluoro, bromo or chloro), cyano radicals or the like, such as chloromethyl, chloropropyl, bromoethyl, trifluoropropyl and cyanoethyl. Preferably, methyl accounts for at least 90 mol % of the entire $R^1$ groups.

It is necessary that at least two $R^1$ groups be alkenyl groups, preferably having 2 to 8 carbon atoms, more preferably 2 to 6 carbon atoms. It is preferred that alkenyl groups account for 0.0001 to 20 mol %, more preferably 0.001 to 10 mol %, and even more preferably 0.01 to 5 mol % of the entire organic groups $R^1$ (i.e., substituted or unsubstituted monovalent hydrocarbon groups). The alkenyl group may be bonded to a silicon atom at the end of the molecular chain or a silicon atom midway the molecular chain or both. The preferred organopolysiloxane contains at least alkenyl groups bonded to silicon atoms at both ends of the molecular chain.

Since the degree of polymerization (DOP) is not particularly limited, any organopolysiloxanes ranging from liquid to gum-like at normal temperature may be used. Typically an organopolysiloxane having an average DOP of 50 to 20,000, preferably 100 to 10,000, and more preferably 100 to 2,000 as measured by gel permeation chromatography (GPC) versus polystyrene standards is used. With respect to the structure, the organopolysiloxane typically has a linear structure based on a backbone consisting of repeating diorganosiloxane ($R^1_2SiO_{2/2}$) units and capped at each end of the molecular chain with a triorganosiloxy ($R^1_3SiO_{1/2}$) group or hydroxydiorganosiloxy ($(HO)R^1_2SiO_{1/2}$) group, although it is acceptable that a branched or cyclic structure be partially included.

Component (B) is a resinous copolymer (or copolymer of three-dimensional network structure) predominantly comprising $R_3SiO_{1/2}$ units and $SiO_2$ units. Herein R is a substituted or unsubstituted monovalent hydrocarbon group, preferably having 1 to 10 carbon atoms, more preferably 1 to 8 carbon atoms. Examples of the substituted or unsubstituted, monovalent hydrocarbon group represented by R include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl, and substituted forms of the foregoing in which some or all hydrogen atoms are substituted by halogen atoms (e.g., fluoro, bromo or chloro), cyano radicals or the like, such as chloromethyl, chloropropyl, bromoethyl, trifluoropropyl and cyanoethyl.

The resinous copolymer (B) may consist of $R_3SiO_{1/2}$ units and $SiO_2$ units while it may optionally further contain $R_2SiO$ units and/or $RSiO_{3/2}$ units wherein R is as defined above, in a total amount of up to 50%, preferably up to 40% based on the total weight of the copolymer. The molar ratio of $R_3SiO_{1/2}$ units to $SiO_2$ units ($R_3SiO_{1/2}/SiO_2$) should be in a range of 0.5/1 to 1.5/1, preferably 0.5/1 to 1.3/1. If the molar ratio ($R_3SiO_{1/2}/SiO_2$) is less than 0.5 or more than 1.5, no satisfactory rubber hardness and strength are obtainable. Further, the resinous copolymer (B) should preferably contain at least two alkenyl groups per molecule. The content of alkenyl is typically at least 0.0001 mol/g, preferably 0.0001 to 0.003 mol/g, and more preferably 0.0002 to 0.002 mol/g. An alkenyl content of less than 0.0001 mol/g may lead to unsatisfactory rubber physical properties whereas an alkenyl content of more than 0.003 mol/g may lead to too high a hardness and hence, a drop of bond strength.

The resinous copolymer may be either a liquid having fluidity at normal temperature (specifically, a viscosity of at least 10 mPa·s, preferably at least 50 mPa·s at 25° C.) or a solid having no fluidity at normal temperature. The resinous copolymer may be obtained from hydrolysis of a suitable chlorosilane or alkoxysilane by the procedure well known in the art.

Components (A) and (B) are combined in such amounts that component (A) is 0 to 100 parts, preferably 20 to 100 parts, and more preferably 30 to 90 parts by weight, and component (B) is 0 to 100 parts, preferably 0 to 80 parts, and more preferably 10 to 70 parts by weight, provided that the total amount of components (A) and (B) is 100 parts by weight.

In a further preferred embodiment, the addition cure silicone rubber composition may further comprise (C) a second resinous copolymer in addition to the resinous copolymer (B), if desired. Component (C) is a second resinous copolymer (or copolymer of three-dimensional network structure) predominantly comprising $R'_3SiO_{1/2}$ units and $SiO_2$ units. Herein R' is a substituted or unsubstituted monovalent hydrocarbon group, preferably having 1 to 10 carbon atoms, more preferably 1 to 8 carbon atoms. Examples of the monovalent hydrocarbon group represented by R' include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl, and substituted forms of the foregoing in which some or all hydrogen atoms are substituted by halogen atoms (e.g., fluoro, bromo or chloro), cyano radicals or the like, such as chloromethyl, chloropropyl, bromoethyl, trifluoropropyl and cyanoethyl.

The second resinous copolymer (C) may consist of $R'_3SiO_{1/2}$ units and $SiO_2$ units while it may optionally further contain $R'_2SiO$ units and/or $R'SiO_{3/2}$ units wherein R' is as defined above, in a total amount of up to 50%, preferably up to 40% based on the total weight of the copolymer. The molar ratio of $R'_3SiO_{1/2}$ units to $SiO_2$ units ($R'_3SiO_{1/2}/SiO_2$) should be in a range of 0.5 to 1.5, preferably 0.5 to 1.3. If the molar ratio ($R'_3SiO_{1/2}/SiO_2$) is less than 0.5 or more than 1.5, a drop of tackiness occurs. Further, in the second resinous copolymer (C), the content of alkenyl is typically less than 0.0001 mol/g (specifically 0 to 0.0001 mol/g), preferably up to 0.00005 mol/g (specifically 0 to 0.00005 mol/g), and more preferably zero (alkenyl-free). An alkenyl content of more than 0.0001 mol/g may lead to a lack of bond strength.

The second resinous copolymer may be either a liquid having fluidity at normal temperature (25° C.) or a solid having no fluidity at normal temperature. A resinous copolymer which is solid at normal temperature is preferred in view of tackiness of the cured product. The second resinous copolymer may be obtained from hydrolysis of a suitable chlorosilane or alkoxysilane by the procedure well known in the art.

Preferably component (C) is blended in an amount of 0 to 400 parts, more preferably 0 to 300 parts by weight per 100 parts by weight of components (A) and (B) combined. An excessive amount of component (C) may lead to a lack of tackiness and a drop of rubber physical properties.

The total content of alkenyl in resinous copolymers (B) and (C) is preferably in a range of 0.00001 to 0.002 mol/g, more preferably 0.00005 to 0.001 mol/g when rubber physical properties and tackiness are taken into account.

Component (D) is an organohydrogenpolysiloxane containing at least two, preferably at least three silicon-bonded hydrogen atoms (i.e., SiH groups) per molecule. It serves as a curing agent in that SiH groups in its molecule undergo hydrosilylation or addition reaction with silicon-bonded alkenyl groups in components (A), (B) and (C) to form crosslinks for thereby curing the composition. The organohydrogenpolysiloxane typically has the average compositional formula (2):

$$R^2{}_b H_c SiO_{(4-b-c)/2} \quad (2)$$

wherein $R^2$ is a substituted or unsubstituted monovalent hydrocarbon group of 1 to 10 carbon atoms, b is a positive number of 0.7 to 2.1, c is a positive number of 0.001 to 1.0, and the sum of b+c is 0.8 to 3.0, and contains at least 2 (specifically 2 to 200), preferably 3 to 100, and more preferably 3 to 50 silicon-bonded hydrogen atoms per molecule. Suitable monovalent hydrocarbon groups of $R^2$ are as exemplified for $R^1$, although $R^2$ is preferably free of aliphatic unsaturation. Preferably, b is 0.8 to 2.0, c is 0.01 to 1.0, and the sum of b+c is 1.0 to 2.5. The molecular structure of organohydrogenpolysiloxane may be linear, cyclic, branched or three-dimensional network. Preferred is an organohydrogenpolysiloxane which is liquid at room temperature (25° C.), specifically in which the number of silicon atoms per molecule, that is, degree of polymerization is 2 to about 300, especially 4 to about 150. The silicon-bonded hydrogen atom may be positioned at the end of or midway the molecular chain or both.

Also, a third resinous copolymer predominantly comprising $R''_2HSiO_{1/2}$ units and $SiO_2$ units or a resinous copolymer predominantly comprising $R''_2HSiO_{1/2}$ units, $R''_3SiO_{1/2}$ units and $SiO_2$ units may be used instead of or in addition to the organohydrogenpolysiloxane having formula (2). Herein, R" is a substituted or unsubstituted monovalent hydrocarbon group, which is as exemplified for R' and preferably free of alkenyl. The third resinous copolymer may consist of $R''_2HSiO_{1/2}$ units and $SiO_2$ units, or $R''_2HSiO_{1/2}$ units, $R''_3SiO_{1/2}$ units and $SiO_2$ units while it may optionally further contain $R''HSiO_{2/2}$ units, $R''_2SiO_{2/2}$ units, $HSiO_{3/2}$ units and $R''SiO_{3/2}$ units wherein R" is as defined above, in a total amount of up to 50%, preferably up to 40% based on the total weight of the copolymer. The molar ratio of $R''_2HSiO_{1/2}$ and $R''_3SiO_{1/2}$ units to $SiO_2$ units, $[(R''_2HSiO_{1/2}+R''_3SiO_{1/2})/SiO_2]$, is preferably from 0.5 to 1.5, more preferably from 0.5 to 1.3.

Examples of the organohydrogenpolysiloxane (D) include, but are not limited to, trimethylsiloxy-endcapped methylhydrogenpolysiloxane, trimethylsiloxy-endcapped dimethylsiloxane/methylhydrogensiloxane copolymers, dimethylhydrogensiloxy-endcapped dimethylpolysiloxane, dimethylhydrogensiloxy-endcapped dimethylsiloxane/methylhydrogensiloxane copolymers, trimethylsiloxy-endcapped methylhydrogensiloxane/diphenylsiloxane copolymers, trimethylsiloxy-endcapped methylhydrogensiloxane/diphenylsiloxane/dimethylsiloxane copolymers, copolymers of $(CH_3)_2HSiO_{1/2}$ units and $SiO_{4/2}$ units, and copolymers of $(CH_3)_2HSiO_{1/2}$ units, $SiO_{4/2}$ units, and $(C_6H_5)SiO_{3/2}$ units. As used herein, the term "endcapped" means that a siloxane is capped at both ends of the molecular chain with the referenced radicals, unless otherwise stated.

The organohydrogenpolysiloxane (D) is blended in an amount of 0.5 to 30 parts, preferably 0.6 to 20 parts by weight per 100 parts by weight of components (A) and (B) combined. No satisfactory rubber strength is obtainable whenever the amount is short or excessive. Also the organohydrogenpolysiloxane (D) is blended in such an amount that the molar ratio of silicon-bonded hydrogen (SiH) in component (D) to silicon-bonded alkenyl in components (A), (B) and (C) may be in a range of 0.2/1 to 1.5/1, preferably 0.25 to 1.2, and more preferably 0.3 to 0.9.

Component (E) is an addition reaction catalyst. Suitable catalysts include platinum-based catalysts, for example, platinum black, platinic chloride, chloroplatinic acid, reaction products of chloroplatinic acid with monohydric alcohols, complexes of chloroplatinic acid with olefins, complexes of chloroplatinic acid with vinylsiloxanes, and platinum bisacetoacetate; palladium-based catalysts; and rhodium-based catalysts. The catalyst may be used in a catalytic amount, which is typically 0.5 to 1,000 ppm, preferably 1 to 500 ppm of platinum group metal based on the total weight of components (A), (B) and (C).

The tacky layer has a hardness which is lower than the hardness of substrate rubber, preferably in the range of 1 to 60, more preferably 2 to 55, and even more preferably 2 to 40 on Asker C hardness scale. An Asker C hardness of less than 1 may lead to poor rubber strength whereas a hardness in excess of 60 may lead to a drop of tackiness.

The tacky layer should preferably have a bond strength of 0.5 to 10 N/25 mm, more preferably 0.7 to 8 N/25 mm to glass, as measured according to the 180° peel test of JIS Z0237 by attaching the layer to glass (FL2.0 by Nippon Plate Glass Co., Ltd.), and peeling the layer at an angle of 180° and a peel speed of 300 mm/min. A bond strength of less than 0.5 N/25 mm is undesirable because of the problem that when the tacky layer is attached to the adherend region, attachment failures may occur due to the low bond strength of the layer to the region. A bond strength in excess of 10 N/25 mm may interfere with re-working and re-adhering capabilities.

To the compositions of which the substrate rubber layer and tacky layer are formed, additional components other than the aforementioned may be added if desired. Suitable additional components include fillers such as fumed silica, precipitated silica, quartz flour, diatomaceous earth, and calcium carbonate; electroconductive agents such as carbon black, conductive zinc white and metal powder; and heat resistant agents such as iron oxide and cerium oxide. Also useful are hydrosilylation regulators such as nitrogen-containing compounds, acetylene compounds, phosphorus compounds, nitrile compounds, carboxylates, tin compounds, mercury compounds, and sulfur compounds; internal parting agents such as dimethylsilicone oil; tackifiers; and thixotropic agents.

Typically the rubber substrate has a thickness of 0.2 to 5 mm, preferably 0.5 to 5 mm, and more preferably 0.5 to 3 mm. A thickness of less than 0.2 mm may be insufficient to bring out sheet elasticity. A thickness in excess of 5 mm may lead to an increased weight to interfere with attachment operation and an increased cost. Typically the tacky layer has a thickness of 0.3 to 3 mm, preferably 0.5 to 2 mm. A tacky layer of less than 0.3 mm may fail to absorb irregularities on the surface of the adherend region where the layer is to be attached. A tacky layer in excess of 3 mm may cause rubber failure because the rubber strength of the mating surface depends on the tacky layer.

The waterproof sheet of two-layer structure preferably has a thickness of 0.5 to 8 mm. The waterproof sheet which is a single layer may have a thickness of 0.2 to 8 mm, preferably 0.5 to 8 mm, and more preferably 0.5 to 5 mm.

The waterproof sheet which is a single layer may be prepared by any well-known method compliant with its material. The waterproof sheet having a tacky layer may be prepared by first forming a rubber substrate. The rubber substrate may be formed as a single layer using a suitable rubber composition, typically a silicone rubber or EPDM rubber composition, or as a composite layer with a metal or another resin. For example, a sheet may be directly formed by compression molding, casting or injection molding. A sheet may be formed on a metal substrate, resin substrate or resin film by insert molding. Alternatively, dipping, coating, calendering or screen printing may be performed to form a rubber sheet integrated with another substrate. It is advantageous that calendaring can be effectively used.

Next the rubber substrate is overlaid with a tacky layer. In one procedure, a rubber substrate-forming composition is cured to form a rubber substrate before the tacky layer is formed thereon. In another procedure, a rubber substrate-forming composition is sheeted on a support film of polyethylene terephthalate (PET) or the like by calendering, and a tacky layer-forming composition is applied onto the rubber substrate-forming composition in the unvulcanized state. In a further procedure, the tacky layer-forming composition is applied onto the rubber substrate-forming composition by a suitable technique such as dipping, coating or screen printing, yielding a multilayer sheet. This procedure is advantageous in that coating can be used for shaping. In any case, the composition is cured preferably by heating at 80 to 250° C. for 10 seconds to 1 hour. This may be followed by post-cure at 120 to 250° C. for 1 to about 100 hours for the purposes of removing low-molecular-weight fractions or the like.

Figure 2:
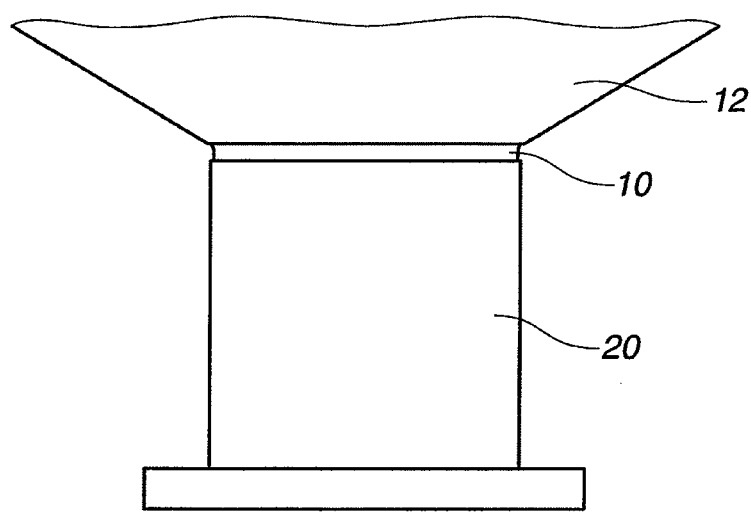
FIG. 2 schematically illustrates a bridge pier and a reinforcement.
Figure 3:
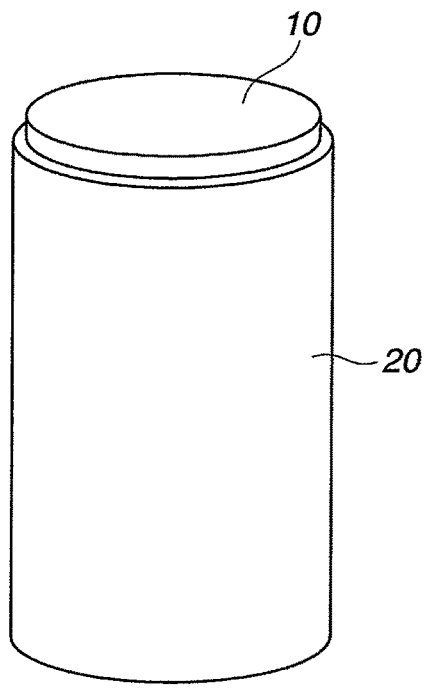
FIG. 3 is a perspective view of the pier and reinforcement of FIG. 2.

The waterproof sheet can be used in repair or renovation works of bridge piers, commonly known as pier lining work, for the purpose of preventing rain or water from penetrating between the bridge pier and a reinforcement enclosing the pier. This working operation is described with reference to FIGS. 2 to 5. FIG. 2 schematically illustrates a bridge pier having a concrete surface. FIG. 3 is a perspective view of the pier as separated. A bridge 12 of concrete is supported by a pier 10 of concrete on a base or ground and the pier 10 is surrounded by a reinforcement 20.

Figure 4:
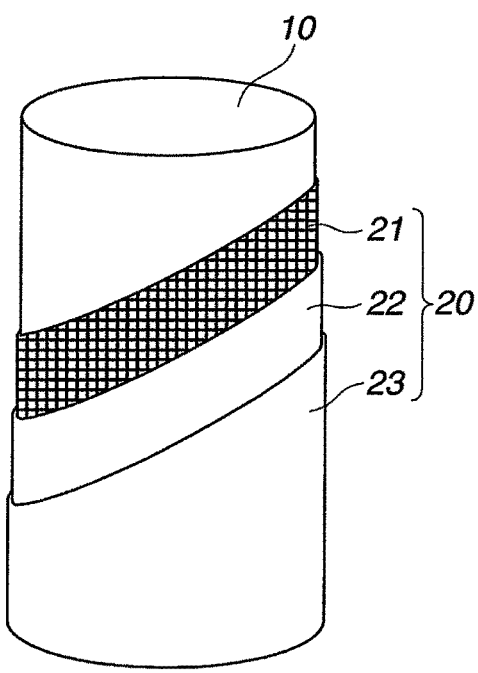
FIG. 4 is a partially cut-away view similar to FIG. 3, showing layers of the reinforcement.
Figure 5:
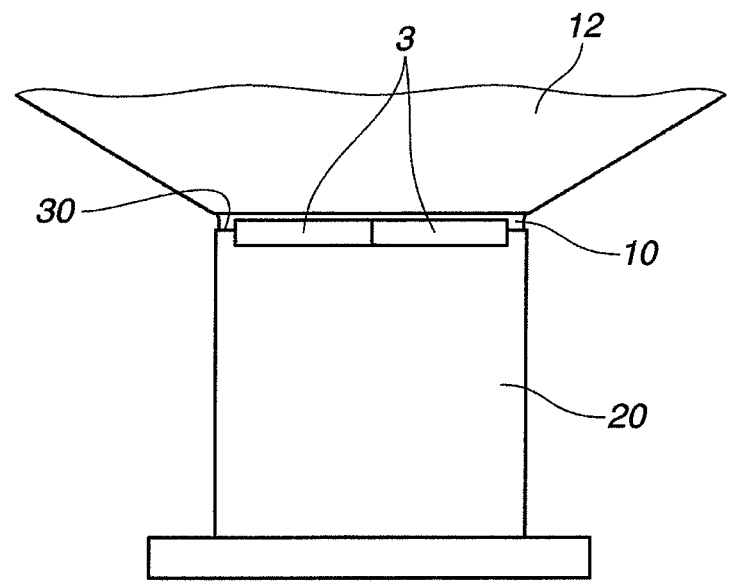
FIG. 5 schematically illustrates a waterproof sheet attached to the interface between the bridge pier and the reinforcement in FIG. 2.

As one example of the bridge pier repair work, the steel-plate lining work is described. As best shown in FIG. 4, the existing pier 10 of concrete defines an interior surface, which is repaired by wrapping the reinforcement 20 therearound. Specifically, a sealer layer 21 and a shrinkage-compensating mortar layer 22 are sequentially deposited around the pier 10, and a steel plate 23 is wrapped as the outermost layer. Although the steel plate is often coated with anti-corrosive paint, the anti-corrosive coating is not complete at the interface 30 between the concrete pier 10 and the reinforcement 20. Then, after the completion of repair work, water originating from rain, snow or mist will deposit on and penetrate into the interface, causing rust. As water penetrates through the interface, it acts to reduce the bond strength of the sealer innermost layer and to render the shrinkage-compensating mortar layer brittle and liable to peel off. These problems can be solved by attaching a waterproof sheet 3 to the adherend region across the interface 30 as shown in FIG. 5. If the adherend region is pre-treated, then the sheet may be more effectively attached thereto. The pre-treatment of the adherend region is not always necessary when the waterproof sheet has tackiness. When the waterproof sheet having a tacky layer is used, the sheet is attached to the adherend region with its tacky layer facing the region.

Figure 6:
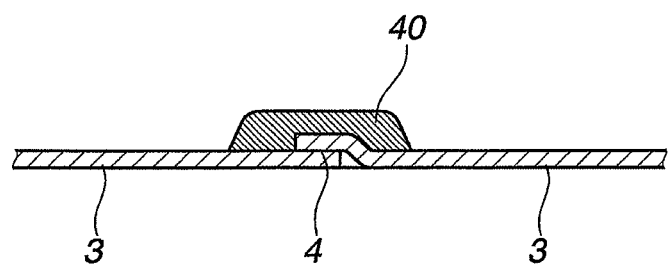
FIG. 6 is a cross-sectional view of a lap joint between two waterproof sheets.

The waterproof sheet 3 is attached to the adherend region so that the sheet may completely cover the interface 30. A single waterproof sheet may be used to circumferentially extend along the interface 30. However, it is more likely to use a plurality of waterproof sheets and arrange them in juxtaposition along the interface 30 whereby the sheets together cover the entire interface 30. In this case, the adherend region can be exposed between adjoining waterproof sheets. It is thus preferred that adjoining waterproof sheets 3 be overlapped to define a lap joint 4 as shown in FIG. 6. The lap joint 4 between sheets 3 preferably has a width of at least 5 mm, more preferably at least 10 mm, and even more preferably at least 20 mm. If the width of the lap joint 4 is less than 5 mm, sheets may sometimes peel from one another during the attachment operation, failing to completely cover the interface 30 and leaving the risk of water penetration. If sheets are largely overlapped, that is, if the width of the lap joint exceeds 50 mm, more waterproof sheets are necessary to completely cover the interface, resulting in an increased cost.

It is noted that a sealant is preferably applied along both the side edges of the waterproof sheet on the pier and reinforcement sides. Also preferably a sealant 40 is applied on the lap joint 4 between waterproof sheets as shown in FIG. 6. Since the sealant used herein is not particularly limited, any of well-known silicone, polysulfide and polyurethane-based sealants may be used. Among others, the silicone-based sealant is preferred for affinity to the waterproof sheet material. These sealants are commercially available. For example, the silicone sealants are available as Sealant-Master 300, Sealant 70 and Sealant 701 from Shin-Etsu Chemical Co., Ltd.

When a waterproof sheet having tackiness is used as the waterproof sheet of the invention, primerless attachment operation is possible. Then work time is drastically shortened.

In many previous cases, sealants are directly applied to obsolescent piers, or no special waterproof measures are taken. When the adherend region is wet because of rain, snow, or water condensation occurring due to a climatic temperature difference, weather, moist air or the like, workers must wait until the adherend region becomes dry. On use of the waterproof sheet of the invention which allows for primerless attachment operation, it can be attached even to a wet adherend region as long as the region is wiped with textile waste or the like to an apparently dry state. This promises the outstanding advantage that repair work can be started immediately after the weather has cleared.

Since the waterproof sheet exerts a waterproof function by virtue of bonding force, the inside can be inspected simply by removing a tie sealer portion at the edge of the sheet. Thereafter, the waterproof sheet exerts a waterproof function again by virtue of bonding force.

EXAMPLE

Examples are given below by way of illustration and not by way of limitation. All parts and % are by weight. DOP is degree of polymerization.

Example 1

A silicone rubber composition was prepared by milling 100 parts of millable type dimethylsilicone rubber compound KE-951-U (Shin-Etsu Chemical Co., Ltd.) with 20 parts of surface-treated dry silica having a BET specific surface area of 160 m²/g (trade name R8200 by Nippon Aerosil Co., Ltd.) and 2 parts of a silanol-containing dimethylpolysiloxane having an average DOP of 5 as dispersant on a two-roll mill and holding in an oven at 100° C. for one hour. The composition was worked into a sheet of 1.5 mm thick.

Example 2

A silicone composition was prepared by providing 100 parts of a base compound composed of vinyl-containing dimethylsilicone (average DOP 6,000) and 80% of crystalline silica, and adding thereto 2.4 parts of an organohydrogenpolysiloxane having on average two siloxane-bonded hydrogen atoms at the end (SiH content 0.0013 mol/g) and 0.1 part of vinyl-containing polysiloxane (vinyl content 0.0007 mol/g) as reaction regulator. To the silicone composition, 0.1 part of a platinum catalyst (Pt concentration 1%) was added to form a putty composition. The putty composition was press molded at room temperature into a sheet of 1.5 mm thick.

Example 3

A commercially available butyl rubber sheet of 1.5 mm thick (trade name ES-D31510 by Kyowa Co., Ltd.) was used.

Example 4

A silicone rubber composition was prepared by adding 10% of silicone resin powder (vinyl content 0.0007-0.0010 mol/g) to millable type dimethylsilicone rubber compound KE-551-U (Shin-Etsu Chemical Co., Ltd.). To 100 parts of the silicone rubber composition was added a vulcanizing agent, specifically 0.5 part of C-25A and 2.0 parts of C-25B (both from Shin-Etsu Chemical Co., Ltd.). The mixture was milled on a two-roll mill and calendered on an embossed PET film of 100 μm thick to form a sheet of 1.5 mm thick. This was heated in a heating furnace at 125° C. for 10 minutes, yielding a sheet-shaped product.

Example 5

To 100 parts of millable type dimethylsilicone rubber compound KE-675-U (Shin-Etsu Chemical Co., Ltd.) was added a vulcanizing agent, specifically 0.5 part of C-25A and 2.0 parts of C-25B (both from Shin-Etsu Chemical Co., Ltd.). The mixture was milled on a two-roll mill and calendered on an embossed PET film of 100 μm thick to form a sheet of 1.5 mm thick, yielding an unvulcanized silicone rubber composition in sheet form (substrate layer).

Using a comma coater, a composition containing 100 parts of a silicone resin (average vinyl content 0.0085 mol/g), 0.1 part of a platinum catalyst (Pt concentration 1%) and 1.8 parts of organohydrogenpolysiloxane (average silicon-bonded hydrogen content 0.0009 mol/g) was coated onto the substrate layer and heated in a heating furnace at 125° C. for 10 minutes, yielding a sheet-shaped product.

These products were examined for various properties and waterproofness, with the results shown in Table 1.

Tackiness

A 180° peel test was carried out according to JIS Z0237. The sheet was cut to a piece of 25 mm wide and 10 cm long. The sheet piece with its tacky layer inside was attached to a glass plate of 4 mm thick (FL2.0 by Nippon Sheet Glass Co., Ltd.) which had been degreased with alcohol and air dried. The sheet piece was peeled from the glass plate at room temperature, an angle of 180° and a speed of 300 mm/min, during which bond strength was measured.

Long-Term Attachment Stability

The sheet was cut to a piece of 25 min wide and 10 cm long. The sheet piece with its tacky layer inside was attached to a glass plate of 4 mm thick. The assembly was held at room temperature and 50% RH for one month. The sheet piece was peeled from the glass plate at room temperature, an angle of 180° and a speed of 300 mm/min, during which bond strength was measured.

Waterproofness

Waterproofness was evaluated by providing waterproof sheet sections of 20 cm Wide×100 cm long, and attaching them in continuous juxtaposition to the interface between a bridge pier and a reinforcement as shown in FIG. 5. A sealant, Sealant-Master 300, was applied to a distance of 2 cm from the sheet edge toward the pier or reinforcement.

After one month or 6 months from the attachment, a sheet sample shutting off rain water penetration is rated good (○) whereas a sheet sample allowing rain water penetration is rated reject (x).

TABLE 1

|  | Example | | | | |
|---|---|---|---|---|---|
| State | 1<br>clay<br>un-<br>vulcanized | 2<br>clay<br>vulcanized | 3<br>sheet<br>un-<br>vulcanized | 4<br>single<br>layer<br>sheet,<br>vulcanized | 5<br>multilayer<br>sheet<br>vulcanized |
| Rubber hardness (Durometer type A) | — | 45 | — | 35 | 74 |
| Tensile strength (Mpa) | — | — | 0.08 | 9 | 8.5 |
| Elongation (%) | — | — | 1,000 | 600 | 270 |
| Tear strength (kN/m) | — | — | — | 20 | 10 |
| Asker C (tacky layer) | — | — | 35 | — | 11 |
| Bond strength, N/25 mm | 2.2 | 3.6 | 0.6 | 2.8 | 3.5 |
| Long-term attachment stability, N/25 mm | 2.0 | 3.6 | 0.5 | 2.7 | 3.4 |
| Waterproofness after 1 month | ○ | ○ | ○ | ○ | ○ |
| Waterproofness after 6 months | ○ | ○ | ○ | ○ | ○ |

Japanese Patent Application No. 2012-220342 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for waterproof working a bridge pier by reinforcing and repairing the bridge pier by wrapping a reinforcement around the pier comprising the step of attaching a waterproof sheet to the interface between the pier and the reinforcement so as to cover the interface in a liquid-tight manner for thereby preventing water penetration through the interface, wherein the waterproof sheet comprises a substrate layer and a tacky layer which lies on one surface of the substrate layer and which is to attach to and cover the interface, said tacky layer being formed of a cured product of an addition cure silicone rubber composition, said composition comprising (A) 0 to 100 parts by weight of an organopolysiloxane containing at least two silicon-bonded alkenyl groups per molecule, having the average compositional formula (1):

$$R^1_a SiO_{(4-a)/2} \qquad (1)$$

wherein $R^1$ is each independently a substituted or unsubstituted monovalent hydrocarbon group of 1 to 10 carbon atoms, and a is a positive number from 1.5 to 2.8, (B) 0 to 100 parts by weight of a resinous copolymer predominantly comprising $R_3SiO_{1/2}$ units and $SiO_2$ units in a molar ratio ($R_3SiO_{1/2}/SiO_2$) of 0.5/1 to 1.5/1, wherein R is a substituted or unsubstituted monovalent hydrocarbon group and contains an alkenyl group, a total amount of alkenyl being at least 0.0001 mol/g, with the proviso that the total amount of components (A) and (B) is 100 parts by weight, (D) an organohydrogenpolysiloxane containing at least two silicon-bonded hydrogen atoms per molecule, in an amount of 0.5 to 30 parts by weight per 100 parts by weight of components (A) and (B) combined, and such that the molar ratio of silicon-bonded hydrogen in component (D) to silicon-bonded alkenyl in components (A) and (B) may be in a range of 0.2/1 to 1.5/1, and (E) a catalytic amount of an addition reaction catalyst, said cured product presenting a tacky surface.

2. The method of claim 1 wherein the addition cure silicone rubber composition further comprises (c) a resinous copolymer predominantly comprising $R'_3SiO_{1/2}$ units and $SiO_2$ units in a molar ratio ($R'_3SiO_{1/2}/SiO_2$) of 0.5/1 to 1.5/1, wherein R' is a substituted or unsubstituted monovalent hydrocarbon group, R' does not contain an alkenyl group or contains an alkenyl group in a total amount of less than 0.0001 mol/g, in an amount of 0 to 400 parts by weight per 100 parts by weight of components (A) and (B) combined, wherein when component (C) contains alkenyl, the molar ratio of silicon-bonded hydrogen in component (D) to silicon-bonded alkenyl in components (A), (B) and (C) is in a range of 0.32/1 to 0.75/1.

3. The method of claim 1 wherein the substrate layer comprises an unvulcanized elastomer.

4. The method of claim 3 wherein the substrate layer comprises an elastomer selected from the group consisting of silicone rubber, EPDM rubber, butyl rubber, chloroprene rubber, and natural rubber.

5. The waterproof sheet of claim 3 wherein the substrate layer comprises an elastomer having a hardness of 10 to 90 on Durometer type A scale, a tensile strength of at least 3 MPa, an elongation of 100 to 800%, and a tear strength of at least 3 kN/m.

6. The method of claim 1 wherein the substrate layer comprises a vulcanized elastomer.

7. The method of claim 6 wherein the substrate layer comprises an elastomer selected from the group consisting of silicone rubber, EPDM rubber, butyl rubber, chloroprene rubber, and natural rubber.

8. The waterproof sheet of claim 6 wherein the substrate layer comprises an elastomer having a hardness of 10 to 90 on Durometer type A scale, a tensile strength of at least 3 MPa, an elongation of 100 to 800%, and a tear strength of at least 3 kN/m.

9. The method of claim 1 wherein the tacky layer has an Asker C hardness of up to 60.

10. The method of claim 1 wherein the tacky layer has a bond strength of 0.5 to 10 N/25 mm to glass.

11. The method of claim 1 wherein the substrate layer has a thickness of 0.2 to 5 mm and the tacky layer has a thickness of 0.3 to 3 mm.

12. The method of claim 1, the waterproof sheet having a thickness of 0.5 to 8 mm.

13. The method of claim 1 wherein the waterproof sheet is directly attached to the interface without a primer.

14. The method of claim 1 further comprising the step of applying a sealant to the waterproof sheet so as to cover an edge portion of the waterproof sheet on the pier and/or reinforcement side.

15. The method of claim 14 wherein the sealant is a silicone sealant.

* * * * *